May 3, 1949.　　　S. T. FARRELL ET AL　　　2,469,296
BELT DRIVING MECHANISM
Filed March 24, 1944
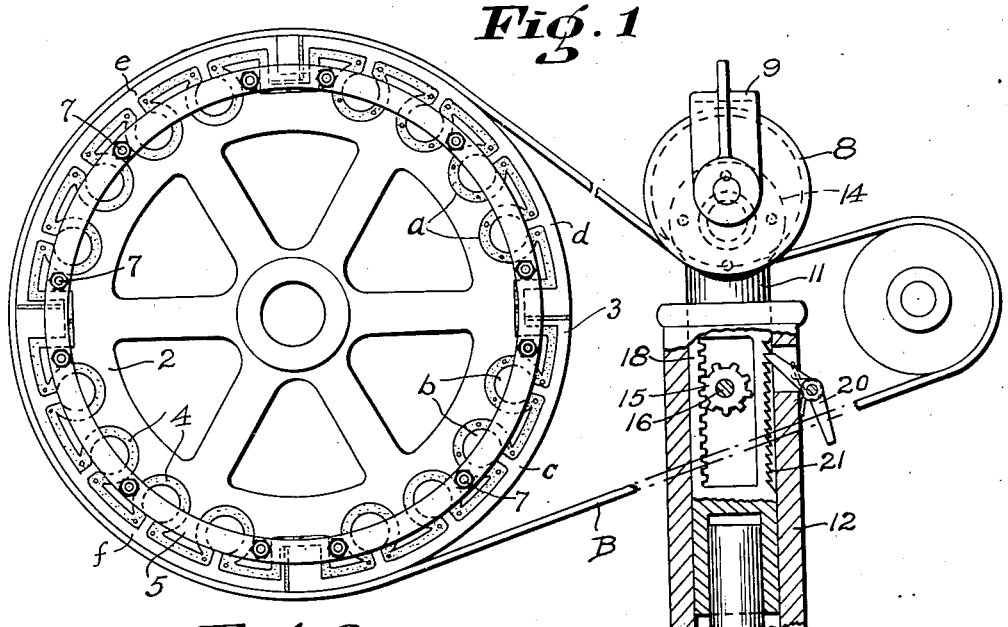
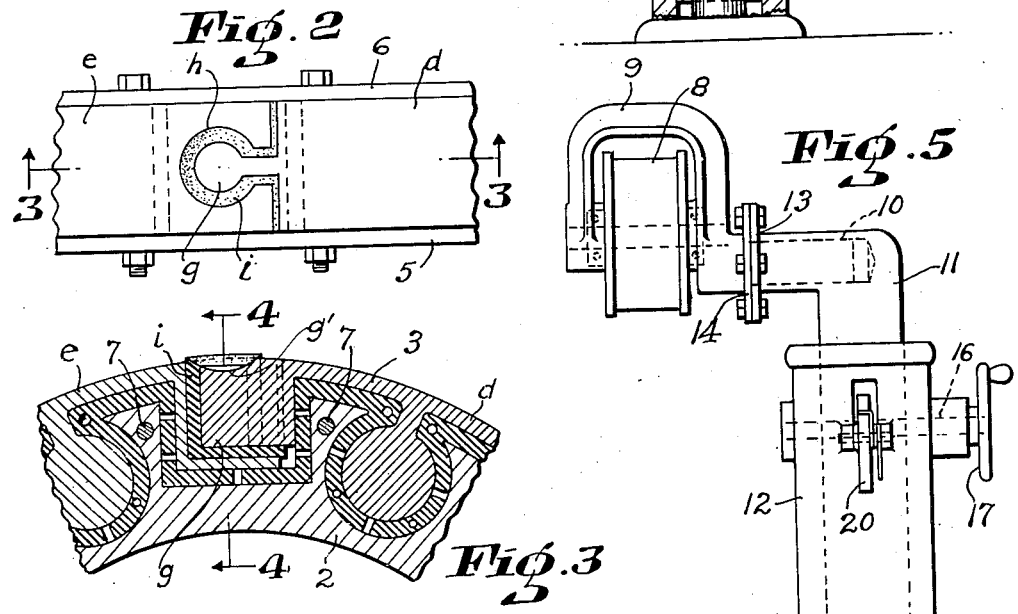
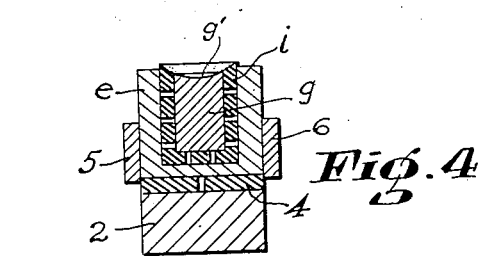
INVENTORS:
Sydney T. Farrell
Frederick L. Farrell
BY
J. H. McCrady,
ATTORNEY.

Patented May 3, 1949

2,469,296

UNITED STATES PATENT OFFICE 2,469,296

BELT DRIVING MECHANISM

Sydney T. Farrell and Frederick L. Farrell, Belmont, Mass.

Application March 24, 1944, Serial No. 527,867

4 Claims. (Cl. 74—242.1)

This invention relates to belt drives and it aims to improve mechanisms of this type with a view both to reducing the liability of breaking a belt under heavy increases in load suddenly applied, as when a clutch is let in too quickly, and also to minimize the strain imposed on the machinery driven by the pulley under such circumstances.

It is a further object of the invention to devise a mechanism for tensioning the belt which will provide for a relatively wide range of adjustment and for a quick release of the tension and an equally quick restoration of it, when desired. In addition, the invention aims to devise a mechanism of this character in which the tensioning pulley can be adjusted quickly into different angular positions to suit a variety of operating conditions.

The nature of the invention will be readily understood from the following description when read in connection with the accompanying drawings, and the novel features will be particularly pointed out in the appended claims.

In the drawings,

Fig. 1 is a side elevation of a belt driving mechanism constructed in accordance with this invention, with some parts broken away and some parts shown in section;

Fig. 2 is a plan view of a small section of the periphery of the pulley shown in Fig. 1;

Fig. 3 is a sectional view on the line 3—3, Fig. 2;

Fig. 4 is a sectional view on the line 4—4, Fig. 3; and

Fig. 5 is a front elevation of the belt tensioning mechanism shown in Fig. 1.

Referring first to Figs. 1 to 4, inclusive, the pulley structure there illustrated comprises a central or hub section 2 and a separate rim section indicated, in general, at 3, the latter encircling the hub section. This section is provided with a series of recesses or grooves $a$, each having an approximately cylindrical cross-sectional form which opens into the peripheral surface of the hub section, the axes of these grooves or recesses lying parallel to the axis of the pulley. The rim 3 is provided with integral lugs or bosses $b$ which are positioned in the respective grooves $a$ and are of essentially the same cross-sectional form as the latter, but they are sufficiently smaller in diameter than the recesses to provide between them the space necessary to accommodate a molded layer of cushioning material 4.

Preferably the rim is made in a plurality of sections, the number of which is selected in accordance with the dimensions of the pulley and the requirements of the service to which it is to be put. In the particular construction shown there are four of these sections indicated in Fig. 1 at $c$, $d$, $e$ and $f$. Usually it will be found most convenient to make the cushioning material 4 in corresponding sections. The parts are assembled by first securing the rim sections together to complete this member, and then sliding it and the cushioning material 4 edgewise on to the hub with the bosses $b$ entering the grooves $a$ of the hub section 2, the assembling movement being in a direction generally parallel to the axis of the pulley.

Preferably the ends of adjoining sections of the rim are interlocked with each other, as best shown in Figs. 2 and 3. As there illustrated, the section $d$ has an extension $g$ of the same general form as one of the elements $b$, and it extends into a socket $h$ similar to the recesses $a$ formed in the section $e$. The walls of these two parts $g$ and $h$ are isolated, one from the other, by an intervening cushioning member $i$. The same construction is provided at each of the joints, so that while this rim is interlocked with the hub section through the medium of the cushioning material 4, the rim sections themselves are interlocked with each other, through the cushioning layers $i$, against separation circumferentially.

In order to prevent any movement of the three parts 2, 3 and 4 axially, one relatively to the other, two retaining plates, indicated at 5 and 6, respectively, are secured to the hub member 3 by bolts 7 where they overlie lateral surfaces of both the members 2 and 3 and also the lateral edges of the cushioning material 4.

The sections of cushioning material 4 and $i$ may be made of rubber, either natural or synthetic, or of other plastic compositions having resilient properties, and they may be compounded by methods well known in the plastic art to give them the desired degree of hardness and elasticity. For this purpose they may be reinforced, when necessary, by fillers of a granular, pulverulent, or fibrous character. Or, they may consist of fabric impregnated, coated, or laminated with elastic compositions so as to give them the necessary degree of toughness and stability for mechanical purposes, while still having the desired cushioning properties. Also, these parts may be perforated or manufactured by any desired method to give them sufficient porosity for cushioning purposes. Whether or not such porosity is necessary will depend upon the nature of the composition and the degree of cushioning effect required.

It will be evident from the foregoing that whether the pulley drives the belt B, or is driven by it, any sudden starting or stopping movement of it will be cushioned by the resilient members i and 4, and that they will, consequently, materially reduce the strain that otherwise would be placed both on the belt and also on the machinery driven by the pulley, in the event that it operates as a driven pulley.

The invention also provides a novel belt tensioning mechanism illustrated in Figs. 1 and 5. As there shown it comprises an idler pulley 8 mounted on ball bearings in a bracket 9, and this bracket has an integral shaft 10 extending into a hole formed to receive it in the upper horizontal end portion of the plunger 11, the latter being slidable vertically in a supporting stand 12. Both the plunger and the bracket are provided with circular coupling flanges 13 and 14 which are bolted together, the bolts passing through holes uniformly placed circumferentially around the axis of the shaft 10, so that by taking out these bolts the bracket 9 can be adjusted into any one of a series of different angular relationships to the stand 12, the bolts being replaced and tightened to secure the bracket in its new position.

The plunger 11 slides in a vertical bore provided to receive it in the body 12 of the stand, and it may be adjusted vertically by means of a pinion 15 mounted fast on a shaft 16 to which also is secured a hand wheel 17, the pinion meshing with a rack 18 which is made integral with or is otherwise rigidly secured to the plunger. A spring pressed pawl 20 cooperates with a diagonally toothed rack 21, also formed on the plunger 11, to lock the plunger releasably in any position to which it may be adjusted. The combined weight of the pulley 8, its supporting bracket 9 and the plunger 11 is ample to apply the desired tension to the belt B.

It will be evident that with this arrangement the tension on the belt may be quickly relieved, whenever desired, merely by turning the hand wheel 17 in a direction to slide the plunger upwardly. This adjustment will customarily be made when the drive is to be left idle for some time, as for example, over a week-end, but the original tension can be restored almost instantly when the drive is to be started up again, simply by releasing the pawl 20 and allowing the weight of the parts above mentioned to carry the pulley down into contact with the belt again. This arrangement makes the device exceptionally convenient to use. Contributing to this result, also, is the fact that the bracket 9 may be adjusted into different positions so as to cooperate either with the upper or lower reach of a belt, or to bear against either side of a vertically or diagonally running belt. Assuming, for example, that it is desired to have the pulley 8 act on the lower run of the belt, the bolts holding the flanges 13 and 14 together can be removed; the bracket 9 can be swung about the axis of its shaft 10 into a position diametrically opposite to that illustrated in Fig. 5 where the pulley will be mainly below the axis of the shaft 10. The bolts then may be replaced and tightened up to secure the flanges 13 and 14 together in their new relationship, and the device may be so placed and so adjusted by means of the gear 15 and pawl 20, as to apply the desired degree of tensioning pressure against the lower side of the lower run of the belt B. In this relationship the pulley is held up against the belt by the pawl 20 instead of by the weight of the parts, as in the relationship shown in Fig. 1.

The eccentric relationship of the pulley shaft with reference to the shaft 10, about which the bracket 9 is adjusted, is useful in making the foregoing adjustment of the pulley.

In a similar manner, the bracket can be adjusted into other relationships to the plunger 11, as may be required to apply tension to belts operating under different circumstances.

The fact that the bracket 9 and plunger 11 support the pulley in a widely offset or overhung relationship to the stand 12 is useful in supporting the pulley in the various relationships required for the purposes just mentioned.

While we have herein shown and described preferred embodiments of the foregoing features of our invention, it will be evident that the invention may be embodied in other forms without departing from the spirit or scope thereof.

The claims of the present application are limited to the belt-tensioning apparatus, the novel features of the pulley structure being claimed in a divisional application.

Having thus described our invention, what we desire to claim as new is:

1. A belt tensioning device comprising a pulley, a support for said pulley including a plunger, a stand in which said plunger is mounted and in which it is guided for vertical sliding movement, means connecting said plunger with said pulley to support the pulley in a laterally overhung relationship to said stand, said means including parts relatively adjustable to support said pulley in any one of a plurality of different angular positions around a horizontal axis passing through said plunger, said means being also constructed and arranged to support said pulley in a belt tensioning position both above or below said axis, as desired.

2. A belt tensioning device according to preceding claim 1, in combination with a rack and gear mechanism mounted on said stand for adjusting said plunger vertically, and a pawl mechanism for holding the plunger in its different positions of vertical adjustment.

3. A belt tensioning device comprising a pulley, a plunger, a stand in which said plunger is mounted and in which it is guided for vertical sliding movement, a bracket mounted on said plunger, said bracket and said plunger having cooperating coupling flanges releasably secured together and supporting the bracket for adjustment about a substantially horizontal axis to support said pulley in any one of a plurality of operative positions in a plane offset laterally from said stand but approximately parallel thereto, a rack on said plunger, a gear mounted on said stand and cooperating with the rack to adjust it and the plunger and said pulley vertically, and means cooperating with said plunger and said stand to hold the plunger in different approximately fixed elevations.

4. A belt tensioning device comprising a pulley, a plunger, a stand in which said plunger is mounted and in which it is guided for vertical sliding movement, a bracket mounted on said plunger, said bracket and said plunger having cooperating coupling flanges releasably secured together and supporting the bracket for adjustment about a substantially horizontal axis to support said pulley in any one of a plurality of operative positions in a plane offset laterally from said stand but approximately parallel thereto, said bracket supporting said pulley for rotation around an axis parallel with but eccentrically disposed with reference to said horizontal axis about which the bracket is adjusted.

SYDNEY T. FARRELL.
FREDERICK L. FARRELL.

REFERENCES CITED

The following references are of record in the file of this patent:

UNITED STATES PATENTS

| Number | Name | Date |
|---|---|---|
| 463,414 | Brown | Nov. 17, 1891 |
| 844,261 | Dieter | Feb. 12, 1907 |
| 844,892 | Pfander | Feb. 19, 1907 |
| 1,017,819 | Sundh | Feb. 20, 1912 |
| 1,227,541 | Kaplan | May 22, 1917 |
| 1,744,486 | Mikesh | Jan. 21, 1930 |
| 2,220,622 | Homer | Nov. 5, 1940 |